Patented May 2, 1939

2,156,451

UNITED STATES PATENT OFFICE 2,156,451

CHROMIUM HYDROXIDE GREEN

Albert Grasshoff, Hanover, and Wilhelm König, Stuttgart, Germany, assignors to G. Siegle & Co., G. m. b. H., Stuttgart, Germany No Drawing. Application July 29, 1936, Serial No. 93,228. In Germany August 2, 1935

18 Claims. (Cl. 134—58)

It is known to manufacture the so-called Guignet's green by heating alkali dichromate and boric acid and extracting with water (see in this connection for example Rose, "Mineralfarben" and Gentele, "Lehrbuch der Farbenfabrikation").

In practice it has been found that, by this process it is indeed possible to obtain a green color which may be employed as a coloring material, but when manufactured on a commercial scale, the products suffer from various disadvantages, and difficulties are encountered in the regular manufacture, particularly with regard to the fact that the heated reaction mass tends to adhere by fusion to and cake on the furnace walls, and the nature of the products makes a sharp grinding necessary.

In the course of exhaustive attempts to eliminate these disadvantages, the surprising discovery has been made that it is possible in an extremely simple manner to obviate these difficulties, and over and above that, even attain various special advantages by carrying out the known process for the manufacture of Guignet's green in the presence of one or more reducing agents.

By working in this way according to the invention, very substantial improvements are secured both with regard to the manufacture and also in the nature of the end products. In the first place, the extremely troublesome adhesion by fusion to or caking on the furnace bottom is obviated, and in addition a further preservation of the expensive furnace installations is also made possible by the fact that the temperature of calcination can be lowered considerably in comparison with the method of working usual heretofore. In the second place, the product is obtained in a form which renders unnecessary a further sharp grinding, as has been necessary heretofore.

A further surprising effect of the present process finally resides in the fact that the additions to be employed according to the invention produce an alteration in tint, which is accompanied by a noteworthy improvement in the yield and increase in the coloring power.

The reducing agents which come into consideration for the present process are advantageously for example elementary sulfur and/or suitable sulfur compounds, such as for example thiosulfate, thiourea, polysulfides and the like.

In place of or as well as sulfur-containing additions, it is furthermore possible to add carbohydrates, such as starch, sawdust, dextrin or the like or other suitable reducing agents.

The quantity of the additions to be employed according to the invention may fluctuate in relatively wide limits and in general need only be relatively slight, for example only 5 to 20 per cent., referred to dichromate. It depends more particularly upon the nature of the additions employed in each case, as well as combinations thereof, and the optimum conditions for each case may always be readily determined by small suitable preliminary tests.

The additional substances according to the invention are added to the reaction components preferably in a fine state of division and thoroughly intermingled, for example by first mixing them intimately with one of the reaction components and then uniting them with the other reaction component, or by intimately mixing both together with the additional substances.

Examples (1) 100 grams of dichromate, 11 grams of sulphur and 300 grams of boric acid are heated for 1 hour at 600 to 620° C. After heating, the mixture while still hot is thrown into 2 liters of water, boiled for a short time, and further washed and dried in the usual manner. About 80 grams of Guignet's green are obtained.

In the scope of this method of working, the quantity of added sulfur may be higher or lower, for example it may vary between 5.4 and 22 grams, without considerable differences being obtained in the result. Likewise, the quantity of boric acid may be varied in accordance with the quality desired for the end product.

(2) In place of sulfur or of a portion thereof, a carbohydrate, for example potato starch, is employed, whereby corresponding alterations may be obtained, the method being carried out in other respects as in Example 1. The carbohydrates may be added in quantities of for example 10–30 grams. In the case of a partial replacement of the sulfur, it is possible to employ for example half sulfur and half starch addition.

(3) Products having a special blue tinge are obtained by adding, in place of elementary sulfur, sodium thiosulfate, with or without the simultaneous addition of one or more of the abovementioned substances. Thus for example it is possible to employ 250 grams of sodium chromate, 750 grams of boric acid and 145 grams of sodium thiosulfate.

(4) Products having a pronounced blue tinge are obtained for example by employing as addition thiourea or polysulfide in the following proportions: 50 grams of sodium chromate, 150 grams of boric acid, 8 grams of thiourea.

We claim:

1. The herein described process for the manufacture of Guignet's green, which process consists in heating alkali dichromate and boric acid in the presence of a reducing agent selected from the group consisting of carbohydrates, sulfur and reducing sulfur compounds.

2. The process for the manufacture of Guignet's green, comprising reacting an alkali salt of chromic acid with boric acid in the presence of a reducing agent selected from the group consisting of carbohydrates, sulfur, and reducing sulfur compounds and lixiviating the product.

3. The process as set forth in claim 2, in which the reducing agent is used in the proportion of 5 to 20 per cent of the alkali salt of chromic acid.

4. The process for the manufacture of Guignet's green, comprising reacting an alkali dichromate with boric acid in the presence of a reducing mixture consisting of a carbohydrate and a reducing agent selected from the group consisting of sulfur and reducing sulfur compounds, and lixiviating the product.

5. The process for the manufacture of Guignet's green, which comprises heating a mixture of about 100 parts by weight of alkali dichromate, from 5 to 22 parts sulfur and about 300 parts boric acid for about 1 hour at 600 to 620° C., boiling the product with water, and washing and drying the product.

6. The process for the manufacture of Guignet's green having a bluish tinge, which comprises reacting about 250 parts by weight of sodium chromate, about 750 parts of boric acid and about 140 parts of sodium thiosulfate, and lixiviating, washing and drying the product.

7. The process for the manufacture of Guignet's green having a pronounced blue tinge, which comprises heating a mixture of about 50 parts by weight of sodium chromate, about 150 parts of boric acid and about 8 parts of thiourea, digesting the product in water, and washing and drying the product.

8. A process, as claimed in claim 1, in which sulfur is used as reducing agent.

9. A process, as claimed in claim 1, in which a reducing sulfur compound is used as reducing agent.

10. A process, as claimed in claim 1, in which the water soluble salt of thiosulfate is used as reducing agent.

11. A process, as claimed in claim 1, in which thiourea is used as reducing agent.

12. A process, as claimed in claim 1, in which the water soluble salt of a polysulfide is used as reducing agent.

13. A process, as claimed in claim 4, in which starch is used as carbohydrate.

14. A process, as claimed in claim 4, in which sawdust is used as carbohydrate.

15. A process, as claimed in claim 4, in which dextrin is used as carbohydrate.

16. A process, as claimed in claim 4, in which the water soluble salt of thiosulfate is used as reducing sulfur compound.

17. A process, as claimed in claim 4, in which thiourea is used as reducing sulfur compound.

18. A process, as claimed in claim 4, in which the water soluble salt of a polysulfide is used as reducing sulfur compound.

ALBERT GRASSHOFF.
WILHELM KÖNIG.